Jan. 5, 1960  W. WILLIAMS ET AL  2,919,948
TIPPING SKIP OR BUCKET
Filed July 2, 1957  2 Sheets-Sheet 2

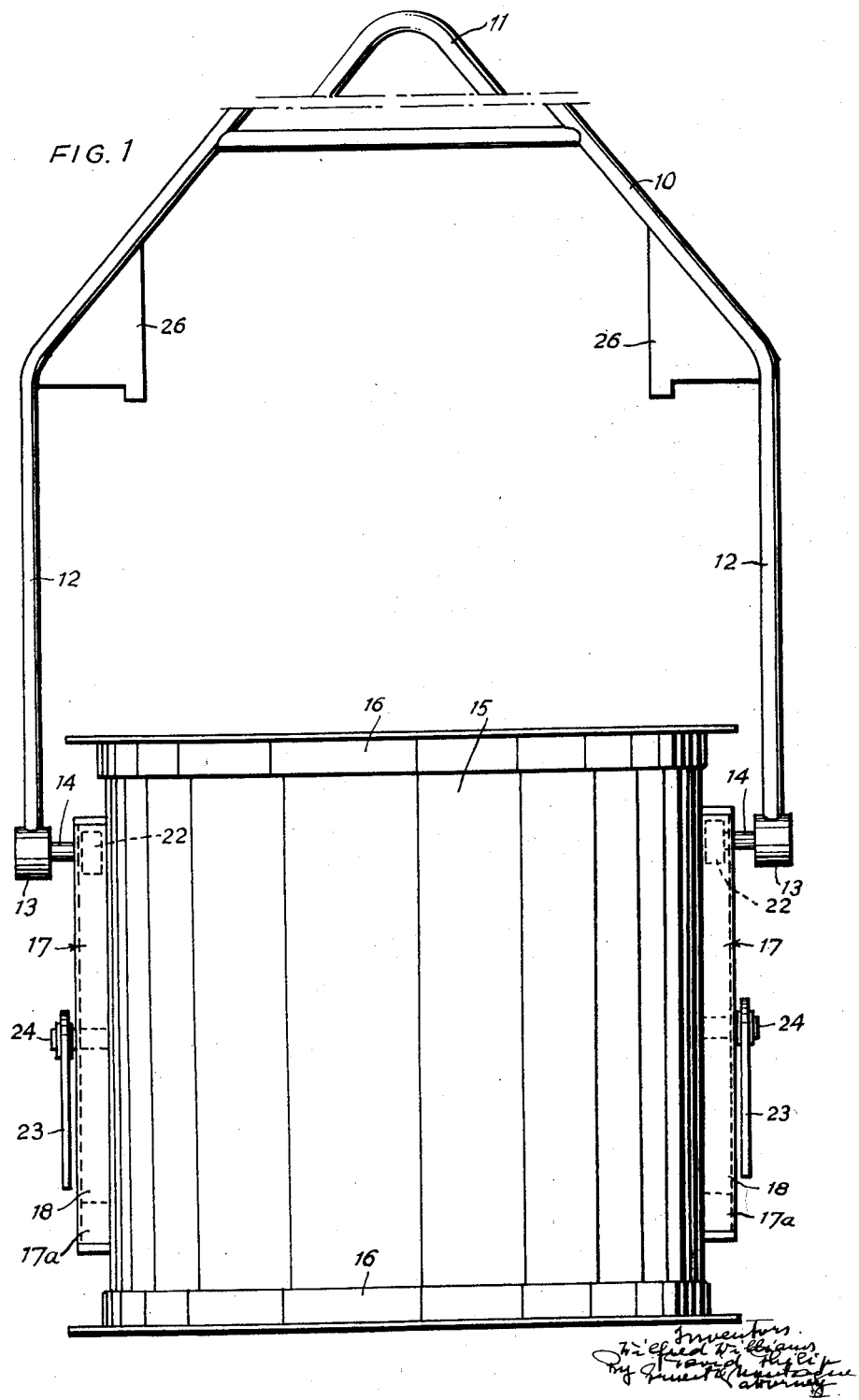

United States Patent Office 2,919,948
Patented Jan. 5, 1960

2,919,948

TIPPING SKIP OR BUCKET

Wilfred Williams, Manchester, and David Philip, Northenden, England

Application July 2, 1957, Serial No. 669,668

2 Claims. (Cl. 294—73)

The present invention relates to tipping skips or buckets of the type adapted to be raised and lowered by a crane, for example for loading vehicles or for transferring material from one situation to another.

It is one object of the present invention to provide a skip or bucket (hereinafter referred to simply as "bucket" for the sake of clarity) of extremely simple construction which facilitates the tipping thereof to discharge the contents, if any.

It is another object of the present invention to provide a tipping bucket which comprises a container having a pivotable lifting handle mounted for vertical movement thereon, detent means being provided whereby after the handle has moved to a point below the center of gravity of the container it cannot be moved upwards relative thereto again, so that if the handle is lifted the bucket overbalances and discharges its contents.

It is a further object of the present invention to provide a tipping bucket which has a handle which preferably consists of a rod-like metal member of inverted U-shape, there being inwardly directed trunnions at the ends of the arms of the U extending into slots provided in channel members secured vertically at each side of the container.

The trunnions preferably each have an enlarged roller at the inner end thereof lying within the channel, so that the trunnions cannot become disengaged therefrom.

So as to facilitate the re-use of the bucket after a load has been discharged, the bottom of the container may conveniently be arranged for movement from one end thereof to the other so that when the bucket is tipped upside down to discharge, the bottom falls to the lower end of the container and can immediately be refilled.

With these and other objects in view which will become apparent in the following detailed description, the present invention will be clearly understood in connection with the accompanying drawings, in which:

Figure 1 is a front elevation of the skip or bucket;

Figure 3:
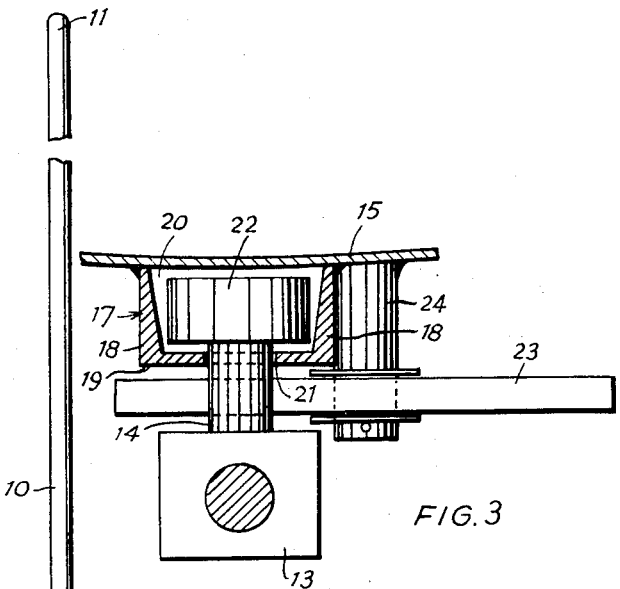
Fig. 3 is a sectional fragmentary plan on an enlarged scale showing the attachment of the handle.

The tipping bucket comprises essentially a handle and a cylindrical container. The handle consists of a heavy rod-like metal member 10 bent to an inverted U-shape, the curved part of the U being provided with a sharp bend 11 into which the hook of a crane (not shown) can engage. The arms 12 of the U extend symmetrically downwards from the sharp bend and each terminates in a boss 13 in each of which is located a trunnion 14 for the bucket. These trunnions 14 extend towards one another and are in axial alignment.

The cylindrical container comprises a heavy gauge metal cylinder 15 which is open at both ends. At each end a stiffening ring 16 is provided circumferentially around the cylinder and integral therewith is an inwardly directed rim or flange 16a. On the inner surface of the container is provided a plurality, preferably three or four, of T-sectioned guides 15a (see Fig. 2) extending along the whole depth thereof and parallel with the axis of the container, these being arranged so that the tail parts of the T's project radially from the cylinder surface.

Within the container is disposed a bucket bottom 16b (Fig. 2), the latter being circular in shape and having radial slots in its edge to correspond with the guides 15a. This bottom 16b which is of heavy gauge steel is a sliding fit within the container, but cannot pass the rim or flange 16 at each end thereof, so it is captive within the container and can move from end to end thereof.

On the outside of the container and diametrically opposite to one another are secured two channel members 17, the latter extending substantially parallel to the axis of the cylinder 15. It will be evident that these channel members 17 are vertical when the container 15 is standing on either of its ends. The sides 18 of the channel members 17 are secured to the container 15, for example by welding, with the base 19 of the channel members 17 spaced from the curved surface of the container 15, so that the channels form compartments 20 (see Fig. 3) at each side of the container 15. At their lower ends the members 17 are widened out as at 17a to facilitate removal of matter which may accumulate therein. The base 19 of each channel is slotted longitudinally at 21, and the trunnions 14 on the bucket handle 10 extend through the respective slots 21 into the compartments 20. An enlarged roller or disc 22 is provided on the inner end of each trunnion 14 so that the trunnions 14 cannot be disengaged from the slots 21 in the channels 17. The rollers 22 can move up and down within the compartments 20 constituted by the channels so that the handle 10 can be raised or lowered relative to the container, with the trunnions 14 moving up and down the slots 21.

Mounted medially of each channel 17 and to one side of the slot thereof is a swinging arm 23 which is roughly triangular in shape. This arm 23 is freely pivoted at its apex at 24 and the base 25 of the triangle is contoured slightly convexly as can be seen from Fig. 2. These arms 23 are dimensioned so that when the trunnions 14 are at the bottom of their respective slots, they are disposed below the bases 25 of the arms 23.

Figure 2:
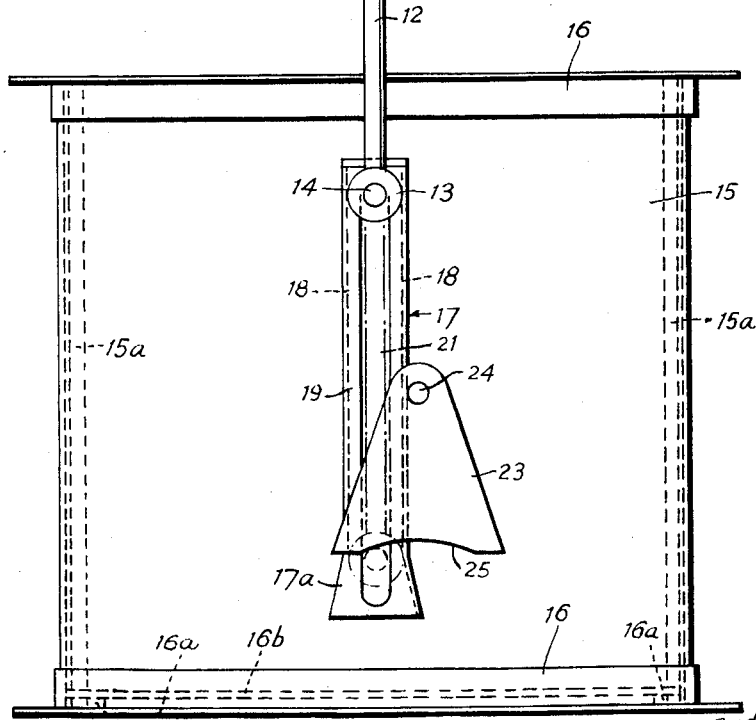
Fig. 2 is a side elevation of the complete bucket.

The bucket is used in the following way: A load is filled thereinto whilst it is just suspended from the crane hook, so that the handle trunnions are at the tops of the slots, as shown in Figs. 1 and 2. After loading, the bucket is transported by a crane to an unloading station where the container 15 is allowed to settle onto the ground. The handle 10 is lowered after the container 15 has settled, so that the trunnions 14 move down the slots 21. As they move down, they push the swinging arms 23 which hang down vertically, to one side and pass below them to the position shown in dotted lines in Fig. 2. When the trunnions 14 reach the bottoms of the slots 21, the swinging arms 23 fall back under the action of gravity so that their concave bases 25 lie across the slots 21. Resting plates 26 provided on the handle 10 then rest on the top of the container 15 and prevent the handle from swinging about its trunnions 14.

The handle 10 is now raised by the crane and the trunnions 14 engage against the concave bases 25 of the swinging arms 23 so that they cannot move up the slots 21. The trunnions 14 are, obviously, below the center of gravity of the container so that as the handle 10 is raised, the container is raised too and overbalances to discharge its contents. As the contents fall out, the loose bottom falls to the lower end of the container, so that as soon as it is empty it can be returned to the filling station for further filling without the necessity of further manipulation such as further reversal of the container.

When the container 15 tips over, the swinging arm 23 which is freely pivoted continues to hang downwards and it lies across the slot 21 but at the other end thereof, so that the cycle of operations described above can be repeated as frequently as desired.

It is to be understood that the constructional details recited in the foregoing example have been given by way of example, and that these details may be varied without departing from the scope of the invention.

While we have disclosed one embodiment of the present invention, it is to be understood that this embodiment is given by example only and not in a limiting sense, the scope of the present invention being determined by the objects and the claims.

We claim:

1. A tipping bucket comprising a cylindrical container, slotted channel members provided vertically along the outer wall and parallel to the vertical axis of said container at diametrically opposed positions, a lifting handle of inverted U-shape having a trunnion at each of its ends, said trunnions extending into the slots of said channel members to permit vertical movement of said handle relative to said container, enlarged rollers carried by said trunnions and disposed within said channel members, said rollers being adapted to run in said channel members, and a swinging substantially triangular arm pivotally mounted at one of the apices of said triangular arm and offset of each of said channel members, the base opposite the pivotal mounting of said arms engaging the corresponding trunnions after the latter have moved in either axial direction to a point below the center of gravity of said container, thereby preventing raising of said handle relative to said container, so that if said handle is lifted, it causes overbalancing of said container in either axial direction.

2. A tipping bucket comprising a cylindrical container having a rim at each end thereof and a loose bottom arranged for movement from one end thereof to the other upon inversion of said container, said rim retaining said loose bottom in the respective end positions, slotted channel members provided vertically along the outer wall and parallel to the vertical axis of said container at diametrically opposed positions, a lifting handle of inverted U-shape having a trunnion at each of its ends, said trunnions extending into the slots of said channel members to permit vertical movement of said trunnions relative to said container, enlarged rollers carried by said trunnions and disposed within said channel members, said rollers being adapted to run in said channel members, and detent means cooperating with said handle, after said trunnions have moved to a point below the center of gravity of said container, thereby preventing raising of said handle relative to said container, so that if said handle is lifted it causes overbalancing of said container, and due to the movement of said bottom, said container is ready for filling in either of its positions.

References Cited in the file of this patent

UNITED STATES PATENTS

| 689,993 | Smith | Dec. 31, 1901 |
| 2,796,283 | Grazier | June 18, 1957 |

FOREIGN PATENTS

| 127,511 | Australia | Apr. 19, 1948 |